United States Patent Office 3,421,906
Patented Jan. 14, 1969

3,421,906
COFFEE STABILIZATION
Ismar M. Reich, Stamford, Conn., and Alexander S. Cascione, Yonkers, N.Y., assignors to Coffee Instants, Inc., a corporation of New York
No Drawing. Filed Sept. 3, 1964, Ser. No. 394,323
U.S. Cl. 99—152                                    2 Claims
Int. Cl. A23f 1/04; A23f 1/06

ABSTRACT OF THE DISCLOSURE

Stabilization of the flavor and aroma of processed coffee products without introducing objectionable aromas and flavors so that the desirable quality of freshly roasted coffee may be retained. The processed coffee having vapors of a stabilizing agent providing sulfur dioxide associated therewith and vapors of ammonia so that any acrid odor resulting from the sulfur dioxide is reduced to a tolerable level.

---

This invention relates to a method for treating roasted coffee to retard staling.

Green unroasted coffee is relatively stable and may be stored for extended periods, even for a year or more exposed to air, without serious loss of quality. The flavor and aroma of coffee is developed only when it is roasted. After roasting, the coffee is very unstable when exposed to air. It is established that exposure of roasted coffee to oxygen, produces stale, objectionable flavors and aromas. The staleness is not rancidity but is apparently a result of the alteration of the compounds which contribute to the desirable characteristics of coffee.

A very considerable effort and cost is expended in order to preserve roasted coffee by means of protective packages. These range all the way from tins in which coffee is packaged, initially under a vacuum obtained by exhausting the air and its associated oxygen, to cellophane packages. The various packages afford varying degrees of protection and stability to the product. The tin container, whether initially under vacuum or whether purged with an inert gas, maintains the product essentially without change. However, there is opportunity for contact with air prior to packaging which results in some loss of quality. In addition, following opening of the container by the consumer, a rapid rate of staling commences. Thus, even the relatively expensive tins that are widely used do not completely preserve the product until it is consumed. Less efficient packages such as cellophane or plastic containers permit some oxygen entry to the package and there is a corresponding staling which occurs at a rate related to the permeability of the package, even when the package remains intact.

It is well-known that ground, roasted coffee is less stable than whole bean roasted coffee. Similarly, a fine grind of roasted coffee is less stable than a medium or coarse grind. The stability also appears to be related to the moisture content of the roasted coffee, stability being poorer at higher moisture levels.

Thus, the stability problem is particularly important in marketing ground roasted coffee which has had a small quantity of moisture added as a practical means of stopping the roasting process and avoiding burning of the coffee.

A similar problem exists in instant coffee which has been "aromatized" by the addition, for example, of a small percentage of finely ground roasted coffee, or by the addition of oil obtained from roasted coffee. In instant coffee there is a much greater surface area exposed to the air. Market requirements for the bulk density of instant coffee are such that almost 80% of the volume of the final container is gas. Even when packaged in inert gas, it is not commercially feasible to eliminate all oxygen from the container, and exposure to air is severe following opening of the container. Furthermore, there is in general a much lower total level of aroma in instant coffee than in regular roasted coffee. The grinding process, also in most cases results in extensive exposure of coffee to air.

Other methods have been suggested for providing means for stabilization of ground coffee such as by the addition of an anti-oxidant either in gaseous or solid form. Such means is disclosed in U.S. Patent No. 1,956,290 entitled "Preparation of Coffee" granted on April 24, 1934.

The above patent discloses the use of certain salts which, when added to ground coffee, release a gaseous vapor such as sulfur dioxide to stabilize the ground coffee. Also suggested is the use of sulfur dioxide vapors. When the salts are used, it has been found that the generation of sulfur dioxide occurs at a relatively slow rate and has only a small effect in stabilizing the coffee aroma. When sulfur dioxide is used, an objectionable acrid aroma is present due to the presence of sulfur dioxide vapor. Furthermore, salts that will generate a sulfur dioxide atmosphere such as potassium sulfite, potassium bi-sulfite or the like, on prolonged contact with roasted coffee, release very objectionable levels of sulfur dioxide from the standpoint of acrid aroma while failing to provide significant protection or stabilizing the coffee to maintain the fresh coffee aroma.

An object of our invention is to stabilize the coffee flavor and aroma without introducing objectionable aromas and flavors, so that the desirable quality of freshly roasted coffee may be retained and provided to the consumer. Another object of our invention is to provide means for coffee stabilization and to prevent staling thereof before the product is packaged, during the storage of the product if the package is not impervious to oxygen, and especially after opening the packaged product and until it is completely used by the consumer. This invention applies to whole bean as well as ground roasted coffee.

A further object of our invention is to stabilize finely ground roasted coffee for admixture with instant coffee (which is dried, aqueous extract of roasted coffee) to improve flavor and provide a fresh coffee aroma for the instant coffee, so that aromatized coffee is superior both in quality and stability to any heretofore available. Still another object of our invention is to provide an inexpensive method of stabilizing roasted coffee in which the coffee maintains the fresh flavor and aroma of freshly roasted coffee for protracted periods until consumed and which, by the addition of adjuvants to stabilize the coffee, does not have an objectionable acrid odor.

Our invention contemplates providing a stabilized coffee product and method in which the addition of adjuvants to fresh roasted coffee will maintain the fresh flavor and aroma of the coffee. Thus, treating roasted coffee in the presence of gaseous vapors and thereafter packaging the treated coffee will stabilize the flavor and aroma inherent of coffee and in which the gaseous vapors will not add an objectionable acrid odor by their presence.

A further objective is to stabilize roasted coffee oil, which may be obtained either by expelling by means of pressure applied to roasted coffee or by solvent extraction of roasted coffee. Such oils may be added to instant coffee to provide improved flavor and aroma. Another objective is to stabilize finely ground roasted coffee for a use as a flavoring in ice cream, baked goods, etc.

It has been found that the tendency of roasted coffee to become stale on exposure to air is retarded greatly by contact of the coffee with sulfur dioxide vapor. Low levels of absorption are effective over a range of levels of absorbed sulfur dioxide. The higher the level, a reduction of the rate of staling of the coffee on exposure to air occurs. However, the odor of sulfur dioxide is readily detectable and is irritating and objectionable. It is detectable by the average person at 0.3 to 1 part per million in the air. The irritating character of its odor, even at low levels, prevents its effective use as a coffee flavor and aroma stabilizer. When the level of sulfur dioxide is reduced sufficiently to avoid the objectionable odor, the effectiveness of its use is correspondingly reduced.

We have discovered that the objectionable odor and flavor of coffee exposed to levels of sulfur dioxide effective as a flavor and aroma stabilizer can be eliminated without harm to the desirable aroma and flavor of the coffee by the addition of ammonia vapor at substantially the same time the coffee is treated with sulfur dioxide vapors.

Ammonia is also irritating and its odor is detectable at a level of 53 parts per million in air. However, our invention employs both vapors at controlled and substantially low yet effective levels, with the unexpected result, that the stabilization effect of sulfur dioxide is not inhibited while its irritating odor is eliminated. The use of this invention provides improved roasted coffee products to the consumer regardless of the type of packaging used. However, when the ground coffee or instant coffee product containing ground roasted coffee is stored in a hermetically sealed container free of oxygen a greatly improved product becomes available to the consumer, particularly, in regard to the very low rate of staling following opening of the container. We have found that preferred levels of sulfur dioxide may range from approximately 0.02% to 0.40% based on the weight of roasted coffee having an irritating and acrid aroma. As indicated, we have overcome these objectionable odors by using vapors of ammonia. We have found that ratios of ammonia vapors to sulfur dioxide vapors of approximately 0.65 to 2.0 are effective in eliminating the irritating and acrid odor of sulfur dioxide vapors. At these levels, ammonia vapor was not detectable to any substantial or intolerable degree. Of importance is the fact that the use of such vapors does not cause undesirable loss of flavor when the coffee is brewed. Ratios below about 0.65 are not effective in preventing the acrid aroma. On the other hand, ratios above about 2.0 result in an objectionable odor caused by excess ammonia.

The preferred method of carrying out our invention is to introduce anhydrous sulfur dioxide vapor continuously directly into the grinding chamber of the mill used to grind roasted coffee. Ammonia vapor is fed into the conduit through which the ground, roasted coffee passes as it leaves the grinding chamber. The flow of both vapors can be easily controlled by means of flow regulators and indicators. Both vapors are available commercially as highly purified products in the form of anhydrous liquids under pressure.

Alternative procedures which also are effective include feeding of both vapors directly to the grinding chamber, or even the feeding of the ammonia first and followed by the sulfur dioxide.

Analytical data indicate that a major proportion of the vapors used is retained by the roasted coffee when the preferred method is employed with cooling during grinding.

It is known that at least a major part of the desirable coffee aroma compounds reside in oil present in the coffee. This oil comprises approximately 15% of roasted coffee. It is also known that both sulfur dioxide and ammonia are highly soluble in this oil. It is believed from consideration of the chemistry of the sulfites, that they would be insoluble in coffee oil. Furthermore the sulfites, being solids, would not have access to much of the roasted coffee oil which, even in very fine grinds of coffee, is largely occluded within the coffee particles. Unlike solids, vapors appear to penetrate the coffee particles and reach the coffee oil so that they can be stabilized. The protection to the fresh aroma of roasted ground coffee afforded by the present invention is applicable to mixtures of coffee so treated with other foods. For example, at a level of 0.2% sulfur dioxide on a roasted coffee solids basis and 0.26% ammonia on a roasted coffee solids basis, finely ground roasted coffee was added to instant coffee at a level of 5% of the mixture. The aroma stability was greatly improved as compared to controls tested. The prepared controls were a sample of ground roasted coffee without vapors of sulfur dioxide and ammonia. A second sample was ground which contained finely ground ammonium sulfite at a level to provide the same level of sulfur dioxide equivalent to that of the standard procedure sample. A third sample was the same as the second sample except that ammonia vapor was also added at a level to bring the total ammonia equivalent to that in the standard sample. The sample with the salt alone was both acrid and stale although not as stale as the untreated sample. The sample with added ammonia vapor to the salt was not acrid but was about as stale as the sample with the salt alone. The samples were packed in jars without the removal of the air present. Yet, were the total amount of sulfur dioxide present to be oxidized to sulfate by the oxygen in the air, it would consume only about 3% of the oxygen present in the jar.

The following are examples illustrating the treatment of roasted coffee according to our invention:

Example I

A blend of Colombian and Costa Rican coffees, conventionally roasted to a medium roast color, is used. This coffee is fed to a Fitzpatrick Model D comminuting machine, manufactured by The W. J. Fitzpatrick Co., Chicago, Ill., at a rate of 190 pounds per hour. The Fitzpatrick mill, with a 10 horsepower motor, is equipped with liquid carbon dioxide cooling to facilitate fine grinding and prevent rapid oxidation of the coffee due to oxygen in air. The mill is operated at a speed of 6960 r.p.m. and is fitted with a 50 mesh screen so that all the coffee is ground finer than 50 mesh. Anhydrous sulfur dioxide is fed into the grinding chamber by means of a tube which penetrates the housing of the mill. The flow rate is controlled by means of a pressure reducing valve, needle valve, and rotameter attached to a cylinder containing liquefied anhydrous sulfur dioxide. The flow rate is maintained at 0.031 s.c.f.m. Anhydrous ammonia is fed similarly except that it is introduced at a rate of 0.157 s.c.f.m. at a point just after the coffee has been ground and has passed through the screen. The finely ground treated coffee is mixed with instant coffee, in batches of 700 pounds, at a ground coffee level of 5% of the mixture. The instant coffee had been purged by passing carbon dioxide gas vertically upward through a bed of the instant coffee until the exiting was analyzed 2% oxygen before mixing with the ground roasted coffee. The mixture is then packaged in glass jars using conventional packaging equipment equipped with carbon dioxide purging. The jars are sealed with metal caps provided with glued glassine inner seals conventionally used as moisture barriers. The packaged product was compared with similarly packaged competitive "aromatized" instant coffee including samples containing finely ground roasted coffee with instant coffee and samples containing coffee oil with instant coffee. Also control samples similarly prepared as stated above were examined. The initial evaluation indicated that all samples were comparable in quality although differing somewhat in character. On re-examination three days after opening the jars, however, the sample treated with sulfur dioxide and ammonia was found to be far superior to all the others in aroma and flavor. These subjective examinations carried out even as long as several weeks showed that the flavor and aroma of the sulfur dioxide and ammonia treated sample was preserved though somewhat diminished while the other samples had become stale.

Example II

The same procedure as in Example I was followed for grinding and treating the roasted coffee with increased levels of sulfur dioxide vapors. In this connection, the level of sulfur dioxide vapors was increased to 0.33% based on the weight of roasted coffee. The ammonia to sulfur dioxide ratio of that in Example I remained constant.

The coffee was evaluated as in Example I. The aroma was good but there was a small loss of the fresh flavor. When compared with the comparative samples used in Example I, the flavor and aroma of the coffee was better and did not become stale as fast. However, the sample according to Example I tasted slightly better.

Example III

Approximately 50 grams of freshly roasted coarsely ground coffee of approx. 10 mesh is placed in a jar of about 240 ml. capacity. A glass tube is inserted with its outlet near the bottom of the jar. The other end of the tube is connected to a cylinder of liquefied anhydrous sulfur dioxide equipped with a flow regulator and indicator. Sulfur dioxide vapor is fed for a period of 15 minutes at a rate of about 2.0 cubic feet per hour. Following this a tube is similarly connected to a cylinder of liquefied anhydrous ammonia which is fed at a rate of about 3.9 cubic feet per hour for 20 seconds. A small sub-sample is taken after the sulfur dioxide flow and before the ammonia flow and is compared with a sample of untreated ground roasted coffee and with the coffee treated with both vapors.

The pH values of brews made by pouring 6 oz. of boiling water on 5 grams of coffee is measured after the brews are cooled.

Sample: pH
Untreated control _____ 5.10
Treated with $SO_2$ _____ 5.00
Treated with $SO_2$ and with $NH_3$ _____ 5.18

To determine the quantity of sulfur dioxide absorbed, samples of coffee brews made in the same way were titrated with dilute sulfuric acid. The titration data indicates that the pH is linear between about pH 4.5 and 5.5 with added acid and the equivalent of 0.0475% sulfur dioxide by weight based on the roasted coffee lowers the pH by 0.1 unit. Thus measurement of pH changes of brews affords an approximate determination of the amount of sulfur dioxide added. Similarly, the approximate ammonia level retained may be calculated. In the above example, it is estimated that the level of added sulfur dioxide is about 0.05%. In the above example, carried out at room temperature, a very large excess of sulfur dioxide is used as compared to that retained. In other experiments with lower temperatures, more efficient contact and mixing, as when the vapor is injected directly into the grinder during grinding, and with finer grinds, the retention of sulfur dioxide is much more efficient, most of the added vapor being retained by the coffee. In the case of ammonia, on the other hand relatively much more of the vapor used is retained, even under the same conditions of contact where the sulfur dioxide retention is inefficient.

Additional samples were prepared in the same manner as indicated above. The calculated retained sulfur dioxide is tabulated below along with evaluation of the relative quality of the samples after storage in air for two days.

| Sample | Initial pH | pH after $SO_2$ treatment | pH after $NH_3$ treatment | Calculated, percent $SO_2$ retained | Evaluation |
|---|---|---|---|---|---|
| 1 | 5.20 | (¹) | (¹) | 0 | Stale. |
| 2 | 5.10 | 5.00 | 5.18 | 0.05 | Acceptable. |
| 3 | 5.20 | 5.00 | 5.31 | 0.10 | Good. |
| 4 | 5.20 | 4.80 | 5.20 | 0.20 | Very good. |

¹ No treatment.

The finely ground coffee as set forth in Examples I and II was discharged from the mill at a temperature of approximately minus 50° C. The level of sulfur dioxide used was approximately 0.16% by weight based on the coffee; that of the ammonia approximately 0.21%.

Other methods for providing the sulfur dioxide and ammonia vapors to the roasted coffee will be apparent to those skilled in the industry. These could include the chemical generation of the vapors separate from or even in contact with the coffee.

It is apparent that modifications and changes can be made without departing from the scope of our invention as defined in the appended claims.

We claim:
1. A method of substantially eliminating the acrid odors present in a processed coffee product treated with sulfur dioxide comprising: exposing the coffee to vapors of sulfur dioxide in an amount of approximately 0.02% to 0.4% based upon the weight of the processed coffee, to stabilize the quality thereof and exposing said coffee to vapors of ammonia, the ratio by weight of ammonia to sulfur dioxide being about 0.65 to 2.0, so that any acrid odor resulting from the sulfur dioxide is reduced to a tolerable predetermined level.

2. A processed coffee product produced according to the process of claim 1.

References Cited

UNITED STATES PATENTS 1,956,290  4/1934  Heuser _____ 99—152
3,049,430  8/1962  Anderson _____ 99—71 X

OTHER REFERENCES

Desrosier, N.W. "The Technology of Food Preservation" 1959, Avi Publ. Co., Westport, Conn., p 71.

McCord, C. P. et al., "Odors Physiology and Control" 1949. McGraw-Hill Co., N.Y., p. 200.

Rideal, S. "Disinfection and the Preservation of Food," 1903, John Wiley and Sons, N.Y., p. 128.

MAURICE W. GREENSTEIN, *Primary Examiner.*

U.S. Cl. X.R.

99—65, 68, 71, 167, 189